United States Patent [19]

Fraioli

[11] 3,852,117

[45] Dec. 3, 1974

[54] SEAL FOR ELECTROCHEMICAL CELLS AND THE LIKE

[75] Inventor: Anthony Vincent Fraioli, Essex Fells, N.J.

[73] Assignee: American Cyanamid Company, Stamford, Conn.

[22] Filed: May 18, 1970

[21] Appl. No.: 38,387

[52] U.S. Cl. ............................... 136/133, 136/175
[51] Int. Cl. ........................................... H01m 1/02
[58] Field of Search ............... 136/6, 110, 133, 175; 220/46

[56] References Cited
UNITED STATES PATENTS

| | | | |
|---|---|---|---|
| 2,332,456 | 10/1943 | McEachron et al. | 136/133 |
| 3,114,085 | 12/1963 | Ruscetta et al. | 136/133 |
| 3,279,953 | 10/1966 | Bierdumpfel | 136/133 |

FOREIGN PATENTS OR APPLICATIONS 604,458    7/1948    Great Britain ..................... 136/133

*Primary Examiner*—Donald L. Walton
*Attorney, Agent, or Firm*—Gordon L. Hart

[57] ABSTRACT

A seal is provided between the cylinder wall and closure disc at one end of the cylindrical container for an electrochemical cell or the like. The seal comprises opposed circular sealing members formed by deformation of the cylinder wall, bearing against opposite faces of the disc around its rim. The seal is closed by axial compression of the cylinder wall causing deformation of the wall to form the sealing members and to press such members against the closure disc. Several variations are described of cell closures embodying the invention.

1 Claim, 5 Drawing Figures

PATENTED DEC 3 1974
3,852,117
SHEET 1 OF 2
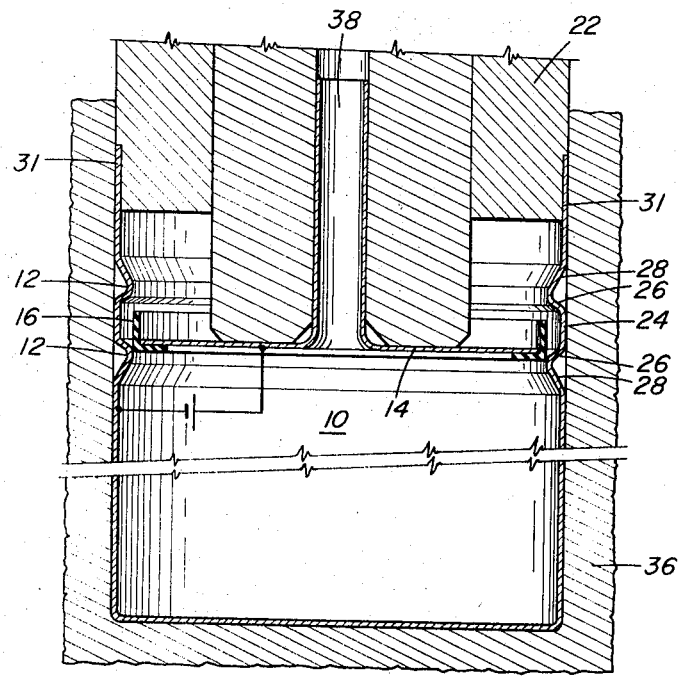
FIG.1
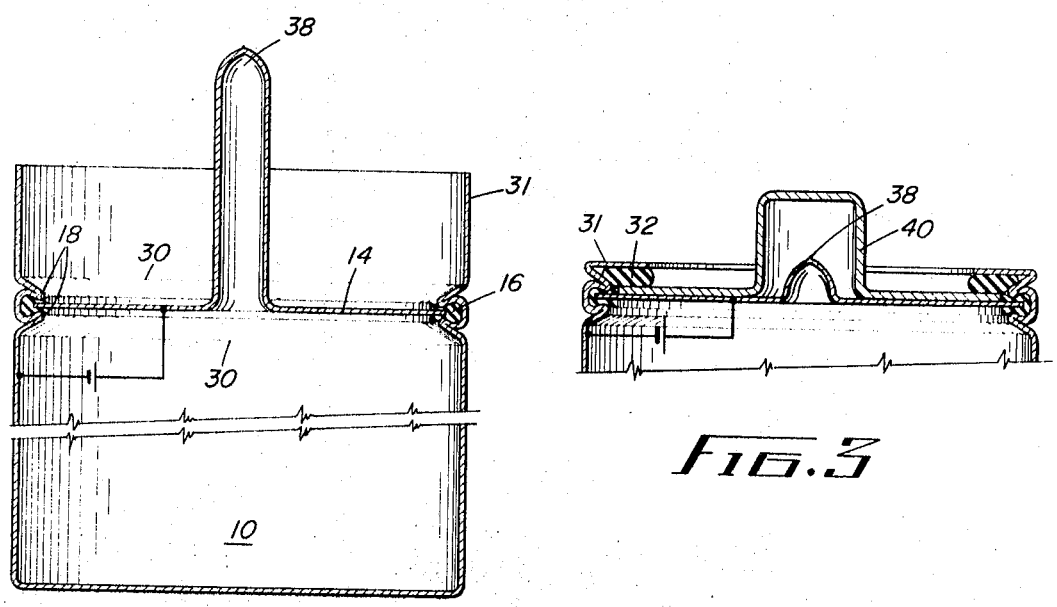
FIG.2
FIG.3
INVENTOR.
ANTHONY VINCENT FRAIOLI
BY Gordon L Hart
ATTORNEY

PATENTED DEC 3 1974

INVENTOR.
ANTHONY VINCENT FRAIOLI

BY Gordon L. Hart

ATTORNEY

SEAL FOR ELECTROCHEMICAL CELLS AND THE LIKE

The invention relates to electric batteries and more particularly to improvements in seals for battery cell enclosures of drawn metal shells and the like.

A variety of different battery enclosure seals for batteries have been proposed. The present invention provides a seal that is particularly useful for cylindrical metal battery cases, which usually will be already closed at one end before the contents are inserted. The cell case is filled, then the open end is closed and sealed. When the contents of the cell includes caustic or toxic liquids or gases, or the contents are susceptible to atmospheric contamination, it is especially important to provide an adequate seal. The present invention provides a double seal which is easy to fabricate and easy to close and which is especially suitable for sealing a cell having contents under pressure.

U.S. Pat. No. 3,279,953 to H. Bierdumpfel describes a cylindrical battery case having a single inwardly protruding recess projection of the cylinder wall, which projection has a circular sealing edge bearing against the inner flat side of a circular closure plate. The present invention provides two similar inward projections of the cylinder wall having opposed circular sealing edges which bear against opposite sides of a flat circular closure disc.

In the drawings,

FIG. 1 illustrates in cross-section a cylindrical battery case with circumferential indentations which are made in the first stage of a preferred method for forming a seal according to the invention. Also shown in FIG. 1 are forming tools comprising a piston and cylinder for closing the seal.

FIG. 2 illustrates in cross-section the first stage of a finished seal according to the invention.

Figure 4:
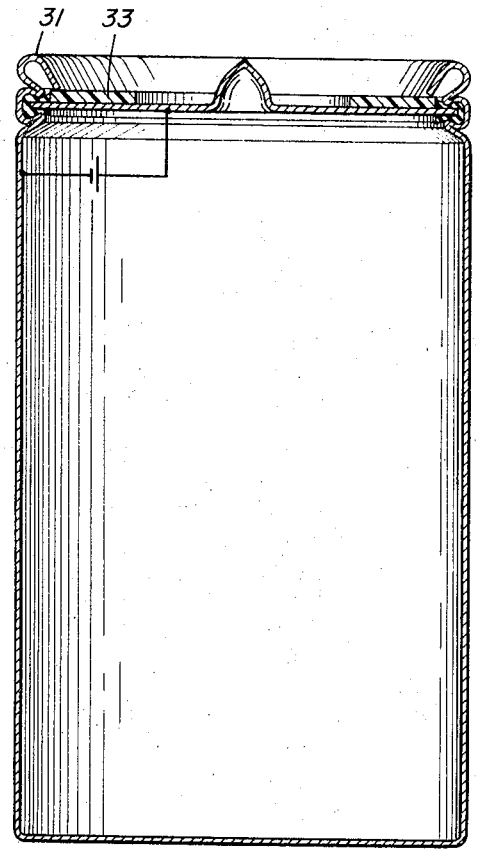
Figure 5:
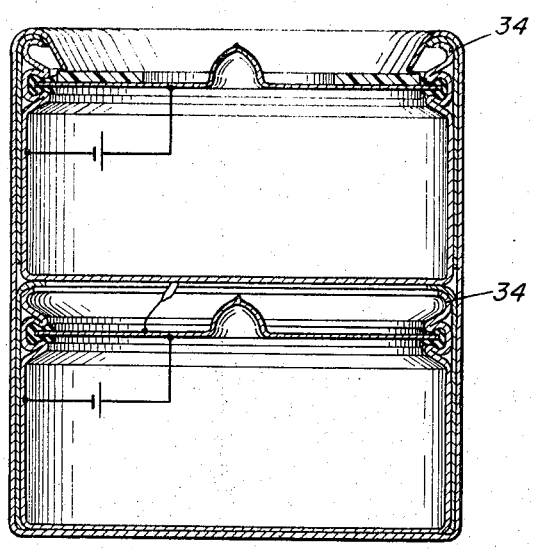

FIGS. 3, 4 and 5 illustrate the secondary closures of some preferred variations and modifications of battery seals embodying the invention. In FIG. 3 a protective metal cover is provided covering the closure disc at the top of the cell. In FIG. 4 a reinforcing ring of dielectric material is clamped over the closure disc at the top of the cell.

FIG. 5 illustrates a battery of two cells stacked in a battery container. Each of the two cells is sealed with a closure embodying the invention. The cell contents are not shown in the drawings.

FIG. 1 illustrates in cross-section a hollow cylindrical metal container 10 with one end closed and the other end open and having a cylinder wall of sheet metal or the like. Two circumferential indentations 12 are formed in the cylinder wall, spaced apart longitudinally. These two indentations are designed, as will be explained in more detail, so that when the cylinder wall is longitudinally compressed, the wall will yield in the region of the two indentations and will be deformed to provide two opposed inwardly extending circular wall members as shown in FIG. 2. Each of these members is formed directly from respective sections of the cylinder wall, and each of the two inwardly extending members has a concentric circular inner sealing edge which will bear against one of the flat sides of a flat circular closure disc 14 that will be positioned inside the cylinder during the forming operations. These two edges make circular seals by bearing against the disc along concentric circles on the opposite flat sides of the disc just inward from the rim of the disc. Elastomeric sealing rings may be placed where the circular edges bear against the plate to improve the seals. In FIG. 1, a single elastomeric band 16 is shown. In FIG. 2, this band has been crimped around the edge of the closure disc and pressed against the disc by the opposed circular sealing edges on both sides of the plate.

The inwardly projecting member nearest the closed end of the cylinder, has its sealing edge 18 inclined in the direction of the open end of the cylinder. The other member, however, has its sealing edge 18 inclined toward the direction of the opposite (closed) end of the cylinder, to provide contact of that second sealing edge with the opposite (outer) flat side of the closure plate. By using two such opposed members extending inwardly from the cylinder wall with opposed sealing edges, the two sealing edges will exert opposed static forces against the elastomeric ring and the disc to maintain the double seal. During formation of the two sealing members in the cylinder wall by longitudinal compression and consequent deformation of the cylinder wall, the two opposed edges of the inwardly inclined members will be forced toward each other; thus, with the closure plate positioned between opposed sealing edges as shown in FIG. 1 the compressive force transmitted from the ram piston 22 by the cylinder wall not only causes formation of the inwardly extended members but also forces both of the opposed sealing edges of the respective inwardly projecting members tight against the opposite faces of the closure plate, preferably with sealing gaskets positioned between each metal sealing edge and the plate. Therefore, it will be seen that use of the two opposed inwardly extending members, according to the invention, permits double sealing of the cylinder at the edges 18 on both sides of the plate by the single final forming operation of applying longitudinal force along the cylinder wall.

The two members that extend inward from the cylinder wall in FIG. 2, and which provide the opposed sealing edges, are conveniently formed in two separate forming steps. The first of these steps, which usually will precede insertion of the closure plate, is the formation of the two ring indentations in the cylinder wall shown in FIG. 1. This is done by means of a metal-forming tool such as a bead forming roller, not shown. This first step shapes and prepares the indentations in the cylinder wall so that the sealing operation, can be carried out simply by the single additional forming step of applying longitudinal compressive force along the cylinder wall with the closure plate positioned as described.

The two circumferential indentations 12 that are formed in the first forming step are spaced apart longitudinally in the cylinder wall with an intermediate, undeformed, section 24 of the regular cylinder wall separating them. Each of the two indentations comprises two inwardly inclined sections, one a shorter section that extends angularly inward from the intermediate cylinder wall section, and the other, a longer section that extends inward at a lesser angle from the regular cylinder wall at the outer side of the indentation. These two inclined sections of the indentation are connected at the inner extremity of each section by a connecting section, which is usually simply a sharp bend of the sheet metal; this connecting section or bend, in preferred embodiments becomes the circular sealing edge 18 as the cylinder wall is compressed to make the seal.

The respective positions of the shorter and longer inclined sections in the two indentations, specifically with both of the shorter inclined sections 26 extending from the intermediate wall section 24, will determine the opposed directions of inclination from normal of the two finished inwardly extending members. The difference in length of the longer section 28 and the shorter section 26 will in part also determine the degree of inclination from normal of the inwardly extending members. As compressive force is applied along the cylinder wall, the metal will yield along all of the respective joint circles where the longer and shorter inwardly inclined sections are joined, respectively, to the extended cylinder wall sections, to the intermediate cylinder wall section 24, and to each other. As the compression continues, the outer surfaces of the shorter and longer inclined sections of each indentation will usually be forced together to form a double-walled, inwardly extending member which will approximate the shape of a hollow frustrum of a right angle cone, see FIG. 2. This frustrum-shaped, double-walled member extends from the larger base 30 of the frustrum at the regular cylinder wall to a concentric circular sealing edge 18 at the smaller base of the frustrum inside the cylinder.

When a circular closure plate 14 has been positioned inside the cylinder as shown in FIG. 1 between the cylinder wall indentations, before and during compression of the cylinder wall, the concentric circular sealing edges of the inwardly extending members will both be pressed against the interposed closure plate as shown in FIG. 2. One sealing edge 18 is forced to bear against each side of the plate, by force transmitted from the cylinder wall through the longer inclined section which is now a part of the inwardly extending member. The length of the intermediate wall section 24 between the two indentations and the lengths of the shorter and longer sections 26, 28 of the two indentations can be proportioned by design in any particular case to determine the precise positions at which the circular sealing edges will bear against the plate. Generally, to make the sealing edges tend toward each other, the combined lengths of the two short sections 26 of the spaced apart circumferential indentations must exceed the length of the intermediate wall section 24 that separates the two short sections (neglecting thickness of the closure plate and gaskets which for the stated relation can be subtracted from the wall section length). Beyond this design requirement, the proportionate lengths of all the members will be largely a matter of practical design choice according to any particular use of the invention. In some embodiments, in which the closure plate 14 is to be positioned inside the cylinder wall 10 after the first circumferential indentations 12 are made, the indentations must be designed to permit insertion of the plate inside the cylinder through one of the indentations 12, and yet must be designed so that the circular sealing edges of both finished inwardly extending members will contact the plate inside the rim of the plate. Thus the sections of the indentation must incline inwardly to a lesser extent than they will do in the finished inwardly extending member. This is regulated by controlling depth of the first indentations in the cylinder wall and the length of the legs of the indentations. This room for passage will not be critical if the closure plate is to be positioned before the indentations are made.

One advantage of the invention is that the extended section 31 of the regular cylinder wall which extends upward from the seal toward the open end of the cylinder is not a necessary part for making the double seal and this extended end 31 of the cylinder wall is available for any of a variety of other useful construction features. This tube end 31 may be crimped inward and pressed against another sealing ring as shown in FIG. 3 to provide still another seal, or it may be crimped inward and used as a clamp to hold in place other members of the battery structure at the top of the cell such as a reinforcing ring 33 as shown in FIG. 4. Or it can be extended longitudinally beyond the seal as a spacing member, as shown in FIG. 5, to provide spacing between two cell units in a stack. The double seal may be formed in cylinder walls made of a variety of sheet metals such as steels including stainless steel, aluminum, zinc, copper, brass and the like. Any sheet material capable of being permanently deformed by force to make the seal can be used. For the battery case, an electrically conductive material such as metal is usually preferred. The case may also be formed from anode metal e.g. zinc, which doubles as the battery cell case and the cell anode.

In most embodiments of the invention the seal will have elastomeric sealing gaskets at the sealing circles. These may be of rubber, synthetic resin or the like. In preferred embodiments these gaskets will be of a material that is also a dielectric so that it electrically insulates the closure disc from the cylinder wall. Thus, the closure disc and cylinder wall may be used respectively as insulated anode and cathode terminals for the cell or battery contained in the enclosure.

The battery seal may be used as part of the enclosure for any of a variety of kinds of electrochemical cells. The double seal is especially useful for cells having a gas component enclosed under pressure such as the sulfur dioxide component of the electrolyte solution in cells of the kinds described in British Pat. Nos. 1,045,228 and 1,100,163.

EXAMPLE I

A unitary stamped sheet-metal hollow cylindrical can 10 is provided as shown in FIG. 1 with one end closed and the other end open. The cylinder measures 1.257 inches inside diameter, 2.825 inches length and is composed of 25 gage 1010 carbon steel sheet.

There are formed two inwardly inclined circumferential indentations 12 in the cylindrical wall of the can, spaced apart with a 0.215 inch long intermediate regular section 24 of the wall between the indentations. These indentations are formed by a beading tool. Each indentation has a shorter leg member 26 extending inward at an angle from the intermediate regular wall section and a longer leg section 28 extending inwardly from the extended regular wall section at a lesser angle. The shorter and longer inclined section of each indentation intersect at a sharp bend joining the two inclined sections. These joints form circular concentric edges 18 inside the cylinder having inside diameters, respectively, of 1.207 inches for the upper bead and 1.142 inches for the lower bead. The difference in bead depth will cause the lower bead to form first under compression. This provides a seat for the disc and ring. As compression continues, the upper bead then will be deformed against the outer face of the disc. The can now has the configuration illustrated in FIG. 1.

A porous carbon cathode and a lithium anode are placed inside the can, below the lower indentation in the cylinder wall, with an electrolyte permeable insulating separator between the two electrodes. The container is filled up to the indentations with a solution of 1 molar lithium bromide in 50 wt. percent acetonitrile, 50 wt. percent propylene carbonate, saturated with sulfur dioxide. The anode is connected inside the cell, by a tab connector, to the container wall. The cell contents are not illustrated in the drawings. A circular metal disc closure plate 14 measuring 0.055 inch thick by 1.160 inch diameter is positioned inside the can with its edge in the interval between the two indentations. This closure plate 14 is connected by a terminal connector to the cathode inside the cell. An electrically insulating synthetic rubber (Neoprene) gasket band 16 is placed around the rim of the closure plate with ends of the band extending on either side of the rim, past the innermost edges of the two indentations in the cylinder wall. At each end of the can compressive force is applied by depressing the press tool 22 shown in FIG. 1, so the compressive force is transmitted along the cylinder wall. This transmitted force causes deformation of first the inner then the outer circumferential indentations to form two inwardly extending doublewall members. During this deformation the innermost edges of the two indentations contract in diameter slightly and each edge moves toward the other until both are pressed firmly against opposite faces of the closure plate. The gasket band is pressed firmly between each of the respective circular sealing edges and the closure plate. Thus two seals are formed, one on each face of the closure plate at the circular joint of the cylinder wall and the closure plate, sealing the contents inside the can.

It is preferred to compress the cell wall while it is fitted inside a supporting cylinder 36, FIG. 1, to prevent spurious deformations in the cell wall. If it is desired to seal the container with the contents under pressure, this may conveniently be done inside a fitted supporting cylinder which is a sealed pressure chamber adapted with a ram piston 22 inside the pressure chamber to compress and seal the cell wall while the cell with its contents are pressurized inside the pressure chamber.

Another way to pressurize the contents of the cell is to have the closure plate 14 or the opposite closed end of the cell fitted with a tube 38, FIG. 1, or other filling means for inserting electrolyte solution into the cell under pressure after the closure plate has been sealed into the cell closure. Such filling means is used for filling the cell under pressure and then is separately sealed after such filling step, as by pinch-sealing the soft metal filling tube 38 after the filling operation is completed, as shown in FIG. 2.

In FIG. 3 there is provided a cap member 40 which is secured at its rim to the top of the cell by the crimped tube end 31 and sealing ring 32, as shown. This cap 40 defines a cup over the closed end of the filling tube 38. If the coldwelded, closed end of the filling tube should leak, a second seal is provided by the sealing ring 32. As an added precaution, not shown in the drawings, the cap 40 may be filled with a sealing compound, such as epoxy resin which will cure and set, to help prevent leakage from the closed end of the filling tube.

In various embodiments of the invention the circular closure plate may be made of a variety of materials. Usually it will be simply a flat disc of metal. The plate may be fitted with any of various attachments or members such as shaped terminal connectors, tubular or other filling means, etc. It is not necessary that the closure plate be metal or other deformable material for use in the invention. The closure plate may be of any material suitable for the intended use, and may be of any suitable circular shape so long as the closure plate in the cell structure presents opposite sides near the circular rim adapted for sealing engagement with the circular sealing edges of the opposed inwardly extending cylinder wall members, as described.

In one preferred embodiment of the invention, not shown in the drawings, the closure plate may comprise two members, such as two flat circular plates laminated or simply laid together. For example, in such a two member plate, the first member may be a plate of a corrosion resistant material such as aluminum for contact with the electrolyte while the second member is of a stronger metal such as steel overlying the first to provide a stronger closure for the cell. In such an embodiment both members are laid together and sealed as a single closure plate with the rims of both members within the two sealing edges 18 formed by the cylinder walls as described above. If the inner member is fitted with a concentric filling tube, the outer member has a concentric hole which is slipped over the filling tube and the outer member is positioned flat against the outer face of the inner member.

I claim:
1. A method of sealing a cylindrical battery case which comprises a metal wall which is a hollow cylinder, said method comprising the steps of
   a. forming two spaced apart circumferential indentations spaced apart longitudinally in said metal cylinder wall, each of said indentations comprising a longer section and a shorter section of said cylinder wall inclined inwardly from regular sections of said cylinder wall adjacent said indentation and joined at a concentric circle inside said cylinder, the said shorter member of each of said indentations extending inward from an intermediate regular section of said cylinder wall separating said indentations;
   b. positioning a circular closure plate concentrically inside said cylinder between said two indentations and
   c. deforming said indentations by compressive force transmitted through said cylinder wall to deform said circumferential indentations and forming thereby two inwardly extending members of said cylinder wall, each of such members approximating the shape of a frustrum of a hollow right angle cone joined at the larger base of said frustrum to a regular section of said cylinder wall and extending inwardly to the smaller base of said frustrum which provides a circular sealing edge inside said cylinder bearing against one face of said closure plate, the respective said sealing edges of said two members each bearing against one of the opposed faces of said closure plate.

* * * * *